United States Patent [19]
Zellmer

[11] 3,777,247
[45] Dec. 4, 1973

[54] BATTERY CHARGING CIRCUIT FOR SUBSCRIBER CARRIER EQUIPMENT

[75] Inventor: Neale A. Zellmer, Belmont, Calif.

[73] Assignee: GTE Automatic Electric Laboratories Incorporated, Northlake, Ill.

[22] Filed: Mar. 1, 1972

[21] Appl. No.: 230,619

[52] U.S. Cl.............. 320/2, 179/2.5 R, 320/21, 323/DIG. 1, 323/4
[51] Int. Cl............... G05f 1/56, H02j 7/06
[58] Field of Search ............ 320/22, 21, 11, 6, 320/2; 323/4, DIG. 1; 179/2.5 R

[56] References Cited
UNITED STATES PATENTS
| | | | |
|---|---|---|---|
| 3,506,910 | 4/1970 | Bevis | 323/4 |
| 3,629,681 | 12/1971 | Gurwicz | 320/21 X |
| 3,670,233 | 6/1972 | Zellmer et al. | 323/DIG. 1 X |

FOREIGN PATENTS OR APPLICATIONS
1,166,867  10/1969  Great Britain ................. 320/11

OTHER PUBLICATIONS
"Two Switching Regulators for Battery Powered Systems" S. W. Billingsly et al. EDN/EEE Feb. 15, 1972, pp. 40–43

Primary Examiner—J. D. Miller
Assistant Examiner—Robert J. Hickey
Attorney—K. Mullerheim et al.

[57] ABSTRACT

This charging circuit is a two-port network with an input port connected through a cable pair to a central office talking battery, and an output port connected across a local subscriber battery. The charging circuit comprises a switching transistor, an inductor, and a current sensing resistor connected in series with the talking battery and the local battery through the lines of the cable pair; and a commutating diode connected across the series combination of the inductor and the local battery. The transistor switch connects the inductor and local battery to and disconnects them from the talking battery during charging of the local battery. When the switch is closed, the inductor stores energy while the local battery receives a charging current from the talking battery. When the switch is open, the magnetic field on the inductor collapses to provide a current through the commutating diode for charging the local battery. The magnitude of the charging current that is drawn from the office battery and is sensed by the resistor is compared with a reference voltage on a reference diode in a second transistor which controls the operation of the transistor switch in order to draw a relatively constant current from the talking battery.

13 Claims, 3 Drawing Figures

BATTERY CHARGING CIRCUIT FOR SUBSCRIBER CARRIER EQUIPMENT

BACKGROUND OF THE INVENTION

This invention relates to subscriber carrier equipment for telephone communications and more particularly to circuitry utilizing a central office talking battery for charging a local battery in self-contained subscriber carrier equipment that is at a location remote from the central office.

Early self-contained subscriber carrier equipment for use at subscriber facilities and utilizing its own local battery power was unsatisfactory since the local battery was not recharged and therefore had to be replaced frequently. A prior art circuit for charging the subscriber battery includes current limiting resistors connected between the line talking battery and the subscriber battery for continuously applying a trickle charge current to the latter. As is well known, the respective pick-up and drop-out values of line current on the cable pair from the central office to the remote subscriber equipment for which the A or pulsing relay contacts close and open are approximately 16 and 6 milliamperes. The resistors in this charging circuit cause the subscriber battery charging current on the cable pair to be at all times less than the 6 mA drop-out value, e.g. 4 mA, to assure that the pulsing relay contacts will open at the start of a dial pulse. A continuous 4 mA trickle charge current through a low voltage local battery is insufficient to keep the local battery charged under moderate usage of the subscriber carrier telephone.

An object of this invention is the provision of an improved circuit for charging the local subscriber battery from the central office talking battery.

BRIEF DESCRIPTION OF THE DRAWING

This invention will be more fully understood from the following detailed description thereof, together with the drawings in which.

Figure 1:
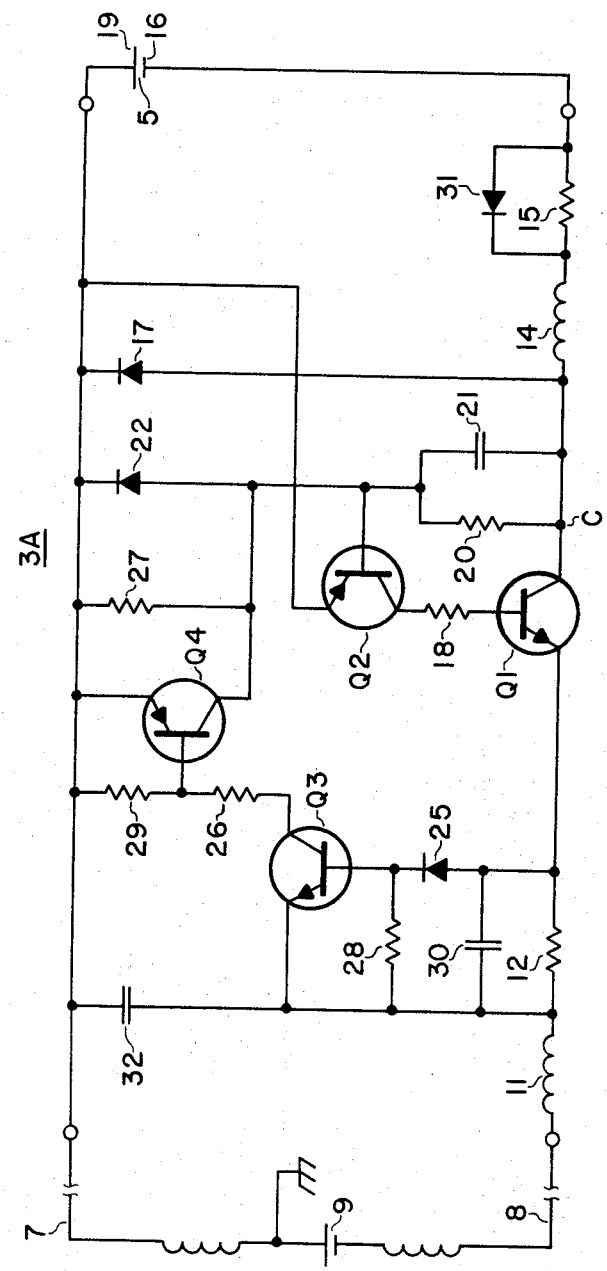
FIG. 1 is a schematic circuit diagram of a battery charging circuit embodying this invention.

Components performing the same or similar functions in the several figures are designated by the same or primed reference numerals.

DESCRIPTION OF THE PREFERRED EMBODIMENTS

Referring now to FIG. 1, a charging circuit 3A is connected across a local subscriber battery 5 and to a cable pair comprising lines 7 and 8. The cable pair connects the charging circuit 3A of the subscriber terminal to the 48-volt central office talking battery 9 which provides power for charging the local battery 5. The line 7 of the cable pair is grounded.

The charging circuit 3A comprises a switching transistor Q1, a control transistor Q2, and a comparator circuit including transistors Q3 and Q4. The respective emitter and collector electrodes of switching transistor Q1 are connected in series with inductor 11 and resistor 12 and with inductor 14 and resistor 15 between the ungrounded line 8 and the negative terminal 16 of the local battery. Resistor 12 senses the level of the charging current that is alternately passed to the local battery through Q1 which is essentially a series switch. Inductor 14 is responsive to current passed by Q1 for storing energy which is employed to charge the local battery 5 when the switching transistor is cut off. Diode 17 is connected across the inductor 14 and the local battery 5 for commutating current passed by the inductor for charging the local battery when Q1 is cut off.

The collector and emitter electrodes of control transistor Q1 are connected through power limiting resistor 18 to the base electrode of Q1 and to the positive terminal 19, respectively, of the local battery 5. The Q2 base electrode is connected through resistor 20 and capacitor 21 to the Q1 collector electrode for speeding up the operation of these transistors when they are changing conduction states. The Q2 base electrode is also connected through diode 22 and Q4 to the positive terminal 19 of the local battery. Diode 22 is employed to protect the control transistor Q2 during the initial voltage swing when the magnetic field on inductor 14 collapses.

The Q3 emitter electrode is connected to the input side of the current-sensing resistor 12 whereas the base electrode thereof is connected through diode 25 to the other side of resistor 12. Diode 25 is employed to protect transistor Q3 from transients and help establish a higher reference level. The Q3 collector electrode is connected through current-limiting resistor 26 to the Q4 base electrode which reverses the phase of the output of Q3 before it is applied to the Q2 base electrode. Transistor Q3 essentially compares the voltage developed across the current sensing resistor 12 with a reference voltage set by the Q3 base-emitter junction and diode 25 for controlling the operation of Q2 and Q1 as described more fully hereinafter. Capacitor 30 is connected in parallel with resistor 12 to store information about the average value of the current drawn from the talking battery 9. The RC time constant of resistor 12 and capacitor 30 is selected to drive Q3 and Q4 into cut-off prior to conduction of Q1 and Q2 as is described more fully hereinafter.

Tie-back resistors 27, 28, and 29 are connected between the base electrodes of the associated transistors Q2, Q3, and Q4, and lines of the cable pair to ensure that these base potentials are returned to the emitter potentials when the transistors are cut off. The resistor 15 ensures start-up of circuit 3A from the local battery 5 when the latter is initially connected thereto. Diode 31 is connected across start-up resistor 15 for preventing a high battery current flowing in the backward direction in circuit 3A and discharging the local battery during an absence of the talking battery 9. The series inductor 11 and a capacitor 32 that is connected across the lines of the cable pair comprise a lowpass filter for preventing the high frequency signal produced by switching transistor Q1 on and off from getting onto the cable pair 7,8. Alternatively, inductor 11 may be a resistor.

The operation of the charging circuit 3A in FIG. 1 will now be considered with the 48-volt central office talking battery 9 disconnected from the charging circuit by Q1 being cut off. A small current drain from the local battery is passed through the base-emitter junction of Q2, resistor 20, inductor 14, and resistor 15 which starts a regenerative cycle that turns on Q1 and Q2 to connect the talking battery 9 to node C. With Q1 in saturation, a linearly rising current flows through resistor 12 and the shunt capacitor 30, Q1, inductor 14, and diode 31 to charge the local battery 5. As the charging current through Q1 increases, energy is stored in the magnetic field of inductor 14 and on capacitor 30. When the voltage across capacitor 30 exceeds the forward bias of diode 25 and the Q3 base-emitter potential, Q3 conducts to turn on Q4. Conduction of Q4 back biases Q2 to decrease the conduction of Q2 and Q1. Regenerative action through resistor 20 and capacitor 21 rapidly drives these transistors Q1 and Q2 into cut-off. During conduction of transistors Q3 and Q4, capacitor 30 discharges towards 0 volts through resistor 12 until the voltage across these elements decreases to a level that biases Q3 and Q4 into cut-off.

Since the current through an inductor cannot change instantaneously, inductor 14 releases the energy stored in the associated magnetic field in order to maintain the current through the inductor 14. The initial inductive kick or voltage spike produced by decay of the field on inductor 14 causes diode 17 to conduct to provide a path for the current passed by the inductor 14 to charge the local battery 5. This inductive kick back biases diode 22 to maintain transistors Q2 and Q1 cut off. When the voltage across the inductor 14 falls below the breakdown voltage of diode 17, this diode is cut off and the Q2 base-emitter junction again draws a small current from the local battery 5 to turn Q1 and Q2 on to repeat this cycle of operation.

Figure 2:
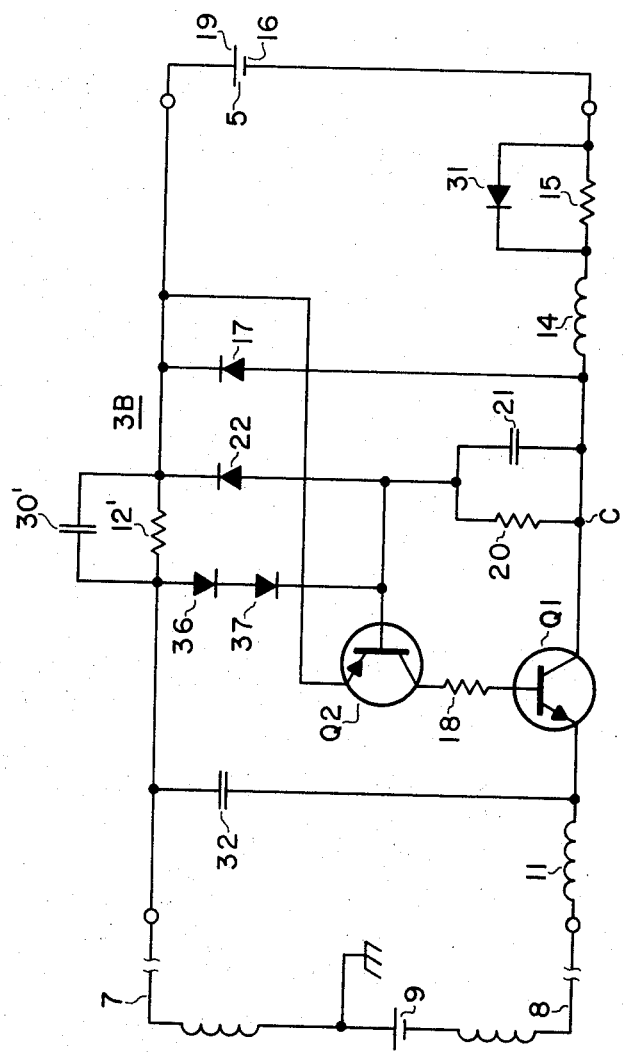
FIG. 2 is a schematic circuit diagram of a modified form of the charging circuit in FIG. 1.

Referring now to FIG. 2, the charging circuit 3B embodying a modified form of this invention is simpler and more economical than that in FIG. 1. Charging circuit 3B is similar to the charging circuit 3A except that the feedback network including Q3 and Q4 is eliminated; the current sensing network comprising resistor 12' and shunt capacitor 30' is connected in series with line 7 of the cable pair, and a pair of diodes 36 and 37 are connected between the input side of resistor 12' and the Q2 base electrode for establishing a reference voltage. The turn on of Q2 and Q1 and build-up of the magnetic field on inductor 14 is similar to that for the charging circuit in FIG. 1. Conduction of reference diodes 36 and 37 causes Q1 and Q2 to also conduct. Capacitor 30' averages the charging current through the sense resistor 12' to prevent transient variations thereof being amplified by the transistors, impressed across capacitor 21, and immediately driving Q2 back into cut-off. When the voltage across capacitor 30' exceeds the forward bias of diodes 36 and 37 and the Q2 base-emitter potential, these diodes are cut off to reverse bias Q2. This decreases the base drive of Q1 so that Q2 and Q1 are regeneratively driven into cut-off. Capacitor 30' discharges toward 0 volts and the magnetic field on inductor 14 collapses to charge the local battery 5 while the transistors are cut off. When the current from the inductor decreases sufficiently, diode 17 is cut off and diodes 36 and 37 conduct.

Figure 3:
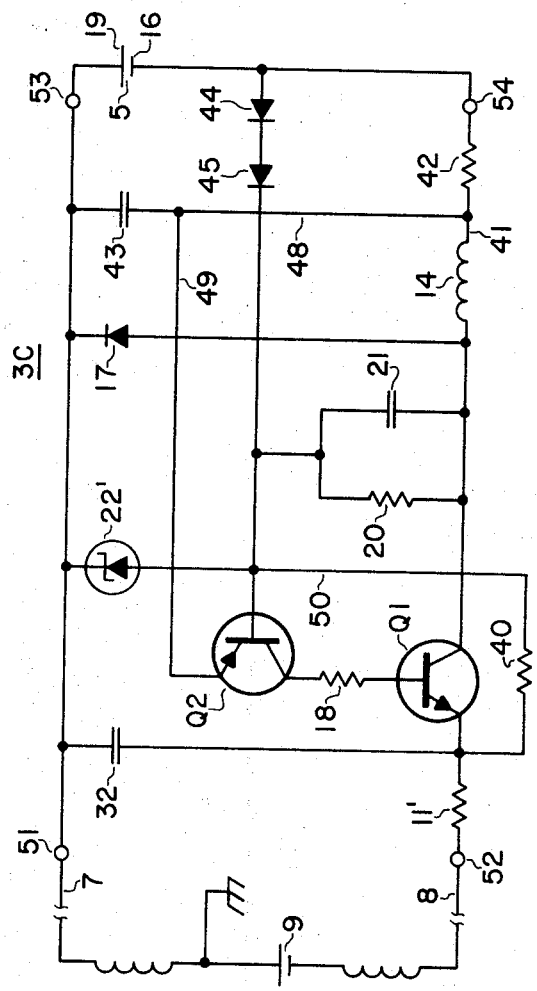
FIG. 3 is a schematic diagram of a preferred embodiment of this invention.

Referring now to FIG. 3, in a preferred embodiment of this invention the start-up resistor 40 of charging circuit 3C is connected between the Q1 emitter electrode and the Q2 base electrode; the terminal 41 of inductor 14 is connected through a current sensing resistor 42 to the negative terminal 16 of the local battery, through a capacitor 43 to the positive terminal 19 of the local battery, and to the Q2 emitter electrode; and a pair of reference diodes 44 and 45 are connected between the negative terminal 16 of the local battery 5 and Q2 base electrode. One of the reference diodes 44 and 45 in this circuit compensates for the Q2 base-emitter junction voltage as is described more fully hereinafter. The resistor 42 and capacitor 43 essentially perform the same functions as the resistor 12, 12' and capacitor 30, 30' in FIGS. 1 and 2. Other elements in FIG. 3 perform the same function as similar components in the circuits of FIGS. 1 and 2.

The operation of charging circuit 3C is similar to that of the charging circuit in FIG. 2. Start-up of the circuit is caused by the Q2 base-emitter junction drawing a small current through resistor 42, lines 48 and 49, the Q2 base-emitter junction, line 50, and resistor 40. This current initiates a regenerative cycle which rapidly drives Q2 and Q1 into saturation and causes the reference diodes 44 and 45 to conduct. With switch Q1 closed, a charging current from the talking battery is passed through the inductor 14 and resistor 42 to charge the local battery 5. Capacitor 43 averages the charging current to prevent transient variation thereof adversely affecting the circuit operation. When the voltage drop across the current sensing resistor 42 and the Q2 base-emitter junction exceeds the voltage across the reference diodes 44 and 45, the Q2 base-emitter junction is reverse biased to regeneratively cut off Q2 and Q1 through feedback elements 20 and 21. This causes the magnetic field on inductor 14 to collapse to produce a current that charges local battery 5 through the commutating diode 17. When this current from inductor 14 decreases to a level to cut off diode 17, this cycle of operation is repeated.

What is claimed is:

1. A two-port network for charging a local battery in a subscriber terminal of a telephone system from a central-office talking battery that is connected across the lines of a cable pair comprising:
   an input port including a pair of terminals for connection to the cable pair;
   an output port including a pair of terminals for connection to the local battery;
   a first resistor;
   an inductor;
   a first switching transistor having base, emitter, and collector electrodes;
   first means for connecting said first resistor, said first transistor emitter and collector electrodes, and said inductor in series with the terminals of said input port through the terminals of said output port; said inductor and said first resistor being connected in that order between said first transistor collector electrode and one terminal of said output port; said first resistor monitoring the value of local battery charging current therethrough; said first transistor being alternately conducting and nonconducting for selectively passing a charging current to said output port;
   a first commutating diode connected between the one side of said inductor away from said output terminal and the other output terminal for commutating current from said inductor when said first transistor is nonconducting;
   means for establishing a reference voltage; and
   means for comparing the voltage across said first resistor and the reference voltage for controlling the operation of said first transistor by a control signal to the base electrode of the latter; said comparing means comprising
   a second control transistor having base, emitter, and collector electrodes;

second means connecting said second transistor collector electrode to said first transistor base electrode, said second transistor emitter electrode to said other output terminal, and said second transistor base electrode to said first transistor collector electrode; said second connecting means comprising a first capacitor regeneratively coupling said first transistor collector electrode and said second transistor base electrode; and third means connecting said second transistor emitter electrode to the other side of said inductor;

said reference voltage means comprising at least one semiconductor diode connected between said second transistor base electrode and said one output terminal.

2. The network according to claim 1 wherein said second connecting means comprises a second capacitor connected between said second transistor emitter electrode and the other output terminal; and including a second start-up resistor connected between said first transistor emitter electrode and said second transistor base electrode.

3. The network according to claim 2 including a fourth resistor connected in parallel with said first capacitor.

4. The network according to claim 3 including a low-pass filter connected across said input port.

5. A two-port network for charging a local battery in a subscriber terminal of a telephone system from a central office talking battery that is connected across the lines of a cable pair comprising:

an input port including a pair of terminals for connection to a cable pair;

an output port including a pair of terminals for connection to the local battery;

a first resistor;

an inductor;

a first switching transistor having base, emitter, and collector electrodes;

first means for connecting said first resistor, said first transistor emitter and collector electrodes, and said inductor in series with the terminals of said input port through the terminals of said output port; said inductor being connected between said first transistor collector electrode and one terminal of said output port; said first resistor being located between one input terminal and said first transistor emitter electrode and monitoring the value of local battery charging current therethrough; said first transistor being alternately conducting and nonconducting for selectively passing a charging current to said output port;

a first commutating diode connected between the one side of said inductor away from said one output terminal and the other output terminal for commutating current from said inductor when said first transistor is nonconducting;

means for establishing a reference voltage; and means for comparing the voltage across said first resistor and the reference voltage for controlling the operation of said first transistor by a control signal to the base electrode of the latter, said comparing means comprising a second control transistor having base, emitter, and collector electrodes;

second means connecting said second transistor collector electrode to said first transistor base electrode, said second transistor emitter electrode to said other output terminal, and said second transistor base electrode to said first transistor collector electrode; said second connecting means comprising a first capacitor regeneratively coupling said first transistor collector electrode and said second transistor base electrode;

a third transistor having a base-emitter junction connected across said first resistor and having a collector electrode; and a fourth transistor having an emitter electrode connected to said other input terminal, having a base electrode connected to said third transistor collector electrode, and having a collector electrode connected to said second transistor base electrode.

said reference voltage means comprising said third transistor base-emitter junction;

said fourth transistor reversing the phase of the output signal from said third transistor prior to application to said second transistor base electrode.

6. The network according to claim 5 including a second diode connected between said third transistor base electrode and said first transistor emitter electrode.

7. The network according to claim 6 including a second capacitor connected across said first resistor and a second resistor connected in parallel with said first capacitor.

8. The network according to claim 7 including an third start-up resistor connected in series between said inductor and said one output terminal, and a third diode connected in parallel with said third resistor.

9. The network according to claim 8 including a low-pass filter connected across said input port.

10. A two port network for charging a local battery in a subscriber terminal of a telephone system from a central office talking battery that is connected across the lines of a cable pair comprising:

an input port including a pair of terminals for connection to the cable pair;

an output port including a pair of terminals for connection to the local battery;

a first resistor;

a capacitor;

an inductor;

a first switching transistor having base, emitter, and collector electrodes;

first means for connecting said first resistor, said first transistor emitter and collector electrodes, and said inductor in series with the terminals of said input port through the terminals of said output port; said first transistor emitter and collector electrodes and said inductor being connected between one input terminal and one output terminal with said inductor between said first transistor collector electrode and said one output terminal; said first resistor being connected between the other input terminal and other output terminal and monitoring the value of local battery charging current therethrough; said first transistor being alternately conducting and nonconducting for selectively passing a charging current to said output port;

a first commutating diode connected between the one side of said inductor away from said one output terminal and the other output terminal for commutating current from said inductor when said first transistor is nonconducting;

means for establishing a reference voltage;

means for comparing the voltage across said first resistor and the reference voltage for controlling the operation of said first transistor by a control signal to the base electrode of the latter; said comparing means comprising a second control transistor having base, emitter, and collector electrodes; and second means connecting said second transistor collector electrode to said first transistor base electrode, connecting said second transistor emitter electrode to said other output terminal, and regeneratively coupling said second transistor base electrode to said first transistor collector electrode through said capacitor;

said reference voltage means comprising at least one semiconductor diode connected between said other input terminal and said second transistor base electrode;

a second start-up resistor connected between said inductor and said one output terminal; and a second diode connected in parallel with said second resistor.

11. A two port network for charging a local battery in a subscriber terminal of a telephone system from a central office talking battery that is connected across the lines of a cable pair comprising:

an input port including a pair of terminals for connection to the cable pair;

an output port including a pair of terminals for connection to the local battery;

a first resistor a capacitor;

an inductor;

a first switching transistor having base, emitter, and collector electrodes;

first means for connecting said first resistor, said first transistor emitter and collector electrodes, and said inductor in series with the terminals of said input port through the terminals of said output port; said first transistor emitter and collector electrodes and said inductor being connected between one input terminal and one output terminal with said inductor between said first transistor collector electrode and said one output terminal; said first resistor being connected between the other input terminal and other output terminal and monitoring the value of local battery charging current therethrough; said first transistor being alternately conducting and nonconducting for selectively passing a charging current to said output port;

a first commutating diode connected between the one side of said inductor away from said one output terminal and the other output terminal for commutating current from said inductor when said first transistor is nonconducting;

means for establishing a reference voltage;

means for comparing the voltage across the first resistor and the reference voltage for controlling the operation of said first transistor by a control signal to the base electrode of the latter; said comparing means comprising a second control transistor having base, emitter, and collector electrodes; and second means connecting said second transistor collector electrode to said first transistor base electrode, connecting said second transistor emitter electrode to said other output terminal, and regeneratively coupling said second transistor base electrode to said first transistor collector electrode through said capacitor;

said reference voltage means comprising at least one semiconductor diode connected between said other input terminal and said second transistor base electrode;

a second diode connected between the other output terminal and the second transistor base electrode; and a second resistor connected in parallel with said capacitor.

12. A two port network for charging a local battery in a subscriber terminal of a telephone system from a central office talking battery that is connected across the lines of a cable pair comprising:

an input port including a pair of terminals for connection to the cable pair;

an output port including a pair of terminals for connection to the local battery;

a resistor;

a first capacitor;

an inductor;

a first switching transistor having base, emitter, and collector electrodes;

first means for connecting said resistor, said first transistor emitter and collector electrodes, and said inductor in series with the terminals of said input port through the terminals of said output port; said first transistor emitter and collector electrodes and said inductor being connected between one input terminal and one output terminal with said inductor between said first transistor collector electrode and said one output terminal; said resistor being connected between the other input terminal and other output terminal and monitoring the value of local battery charging current therethrough; said first transistor being alternately conducting and nonconducting for selectively passing a charging current to said output port;

a first commutating diode connected between the one side of said inductor away from said one output terminal and the other output terminal for commutating current from said inductor when said first transistor is nonconducting;

means for establishing a reference voltage;

means for comparing the voltage across said resistor and the reference voltage for controlling the operation of said first transistor by a control signal to the base electrode of the latter; said comparing means comprising a second control transistor having base, emitter, and collector electrodes; and second means connecting said second transistor collector electrode to said first transistor base electrode, connecting said second transistor emitter electrode to said other output terminal, and regeneratively coupling said second transistor base electrode to said first transistor collector electrode through said first capacitor;

said reference voltage means comprising at least one semiconductor diode connected between said other input terminal and said second transistor base electrode;

a low-pass filter connected across said input port, and a second capacitor connected in parallel with said resistor.

13. A two port network for charging a local battery in a subscriber terminal of a telephone system from a central office talking battery that is connected across the lines of a cable pair comprising:
- an input port including a pair of terminals for connection to the cable pair;
- an output port including a pair of terminals for connection to the local battery;
- a resistor;
- a first capacitor;
- an inductor;
- a first switching transistor having base, emitter, and collector electrodes;
- first means for connecting said resistor, said first transistor emitter and collector electrodes, and said inductor in series with the terminals of said input port through the terminals of said output port; said first transistor emitter and collector electrodes and said inductor being connected between one input terminal and one output terminal with said inductor between said first transistor collector electrode and said one output terminal; said resistor being connected between the other input terminal and other output terminal and monitoring the value of local battery charging current therethrough; said first transistor being alternately conducting and nonconducting for selectively passing a charging current to said output port;
- a first commutating diode connected between the one side of said inductor away from said one output terminal and the other output terminal for commutating current from said inductor when said first transistor is nonconducting;
- means for establishing a reference voltage;
- means for comparing the voltage across said resistor and the reference voltage for controlling the operation of said first transistor by a control signal to the base electrode of the latter; said comparing means comprising a second control transistor having base, emitter, and collector electrodes; and second means connecting said second transistor collector electrode to said first transistor base electrode, connecting said second transistor emitter electrode to said other output terminal, and regeneratively coupling said second transistor base electrode to said first transistor collector electrode through said first capacitor;
- said reference voltage means comprising at least one semiconductor diode connected between said other input terminal and said second transistor base electrode; and
- a second capacitor connected in parallel with said resistor for averaging the battery charging current through said resistor.

* * * * *

UNITED STATES PATENT OFFICE
CERTIFICATE OF CORRECTION

Patent No. 3,777,247        Dated December 4, 1973

Inventor(s)  Neale A. Zellmer

It is certified that error appears in the above-identified patent and that said Letters Patent are hereby corrected as shown below:

In the Abstract, line 10, after "switch" insert -- alternately --. Column 2, line 9, change "Q1" to -- Q2 --. Column 5, line 24 (claim 3, line 2) change "fourth" to -- third --.

Signed and sealed this 16th day of April 1974.

(SEAL)
Attest:

EDWARD M. FLETCHER, JR.　　　　　　C. MARSHALL DANN
Attesting Officer　　　　　　　　　　Commissioner of Patents